A. WOLLENSAK.
FISHING REEL.
APPLICATION FILED AUG. 15, 1910.
1,009,818.
Patented Nov. 28, 1911.
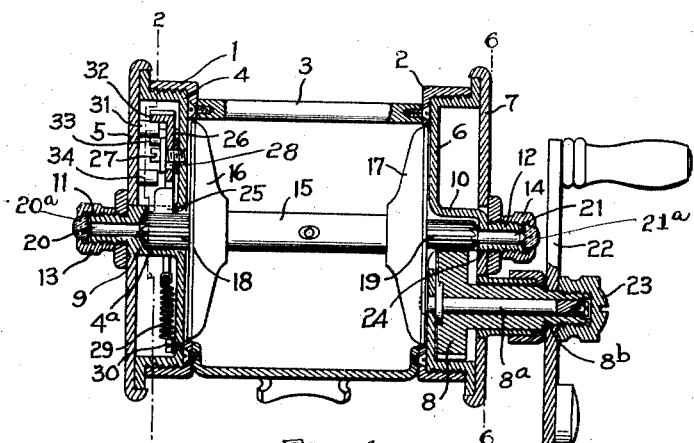
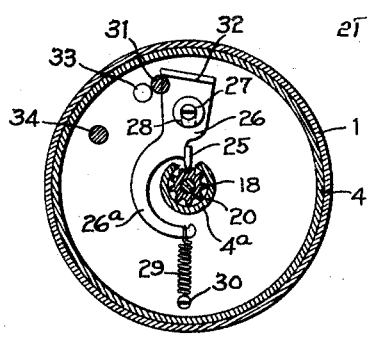
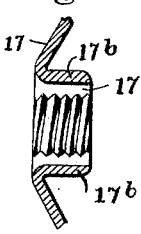
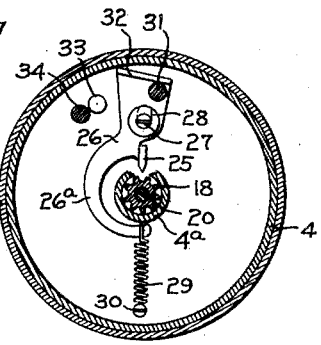
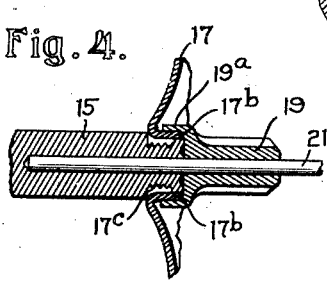
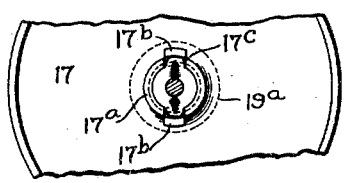
Witnesses:
C. W. Carroll
L. Thon
Inventor:
Andrew Wollensak
by Osgood Davis Morey
his attorneys

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

FISHING-REEL.

1,009,818.   Specification of Letters Patent.   Patented Nov. 28, 1911.

Application filed August 15, 1910. Serial No. 577,372.

*To all whom it may concern:*

Be it known that I, ANDREW WOLLENSAK, a citizen of the United States, and resident of Rochester, in the county of Monroe and State of New York, have invented certain new and useful Improvements in Fishing-Reels, of which the following is a specification.

This invention relates to fishing reels. Its object is simplicity in mechanism, reliability in operation, and economy in manufacture.

In the drawings:—Figure 1 is a central, longitudinal section of a reel equipped with my inventions; Figs. 2 and 3 are sections on the line 2—2 of Fig. 1, showing parts in their engaged and disengaged positions; Fig. 4 is an enlarged longitudinal section of one end of the reel-spool; Fig. 5 is an end view from the right side of Fig. 4, the position of the pinion being shown in dotted lines; Fig. 6 is a partial end view of the reel, a section through some parts being taken on the line 6—6 of Fig. 1; and Fig. 7 is an enlarged longitudinal section of the end of the spool.

The reel-frame proper comprises, as usual, suitable end pieces or rings 1 and 2 that are connected rigidly by cross-rods 3. Within the ring 1, on the left of Fig. 1, is a plate 4 that has a threaded, outwardly-turned flange adapted to enter and engage a corresponding flange on the ring 1. This plate 4 carries part of the click mechanism while a rotatable cover-plate 5 carries the other part. At the other end of the reel—the right hand side in Fig. 1—similar plates 6 and 7 serve to support and inclose the driving pinion 8. Both plates 4 and 6 are represented with an outwardly projecting hub, 9 and 10, respectively, that support the spool, and terminate, respectively, in threaded projections 11 and 12 for nuts 13 and 14 that both carry the usual glass or other bearings for the ends of the reel-hub and also bear against and so secure in place the cover-plates 5 and 7.

The spool comprises a hub 15, the usual flanges 16 and 17, and pinions 18 and 19, one at each end.

A cheap and novel construction for connecting the flanges 16 and 17 to the hub 15 is represented in Figs. 4 and 5, and is one of the features of my invention. Both of the flanges 16 and 17 are attached in the same way, but the construction is illustrated in the drawings only in connection with the flange 17. Referring to Figs. 4 and 5, it will be seen that said flange 17 has an outwardly-turned central sleeve rib $17^a$, with portions $17^b$ pressed radially outward to form recesses $17^c$, and that the sleeve $17^a$ is threaded internally to receive the threaded end of the hub 15. After the hub has been screwed into the sleeve, it is peened down on its ends until the metal is expanded into the recesses $17^c$, so that the flange cannot become loose, and cannot be removed from the hub.

The manner of attaching the pinions 18 and 19 to the hub is shown with reference to the pinion 19 in Figs. 4 and 5. The pinion 19 has an enlarged inner end $19^a$, which is recessed to fit closely over the sleeve $17^a$ and embrace the outward projections $17^b$. In this way the pinions are locked to the hub 15 and the flange 17 so that they must all rotate together.

The spool is journaled on rods 20 and 21 that are driven into the hub 15 from each end, in preference to a single rod extending through the hub from end to end, since it is usual to perforate the hub diametrically in order to afford means for attaching the line to it.

The driving pinion 8 is journaled on a stud $8^a$ that is riveted in the plate 6, being retained upon said stud by any of the well known means usually employed for this purpose, and the crank 22 is attached to an outwardly-extending squared end $8^b$ of the sleeve by a cap-nut 23. The lower half of the pinion-housing 10 is cut away to permit the pinion 8 to engage the pinion 19, leaving a straight edge 24 on the upper half of said housing. The opening in the cover-plate 7 also has a straight edge that contacts with said straight edge 24, as shown in Fig. 1, and thus serves as a guide or gage in setting the cover-plate 7 on the plate 6, readily centering the cover-plate so that its overturned edge assumes the proper position.

The pinion 18 of the click mechanism is contained within the housing $4^a$, which is cut away, as shown in Figs. 2 and 3, to admit a tooth 25 that is attached to a diametrically movable, spring-controlled plate 26. This movable plate 26 has a pin-and-slot connection 27 and 28 with the plate 4. A coiled spring 29 that is attached at one end to a stud 30 on the plate 4, and at its other end to an arm 26ª on the movable plate, holds the tooth 25 in yielding engagement with the pinion 18. In the construction shown in the drawing the cover-plate 5, which is rotative, is employed to withdraw the tooth 25 from engagement with the pinion 18 and hold it out of engagement. The means shown for doing this consist of a pin 31 that projects inwardly from the cover-plate 5 and engages a flange 32 on the movable plate 26. This flange extends across the line of movement of said plate and downwardly at an angle thereto from the point where it is engaged by the pin 31 when the tooth 25 is in engagement with the pinion 18. Accordingly, when the cover-plate 5 is rotated so that the pin 31 moves along the flange 32 from the position shown in Fig. 2 to that shown in Fig. 3, the plate 26 is caused to move outwardly and the tooth 25 is withdrawn from the pinion 18 as shown in Fig. 3.

A stationary pin 33 on the plate 4 serves as a stop to limit the rotation of the cover-plate 5 in one direction by engaging the pin 31, and a pin 34 on the cover-plate 4 limits the rotation of said plate in the opposite direction by engaging the stationary pin 33.

I claim:—

1. A reel-spool comprising a hub and a centrally-perforated flange for each end of the hub, each flange having the edge around its perforation turned outwardly in the form of a sleeve and a portion of the sleeve punched away from the axis of the spool to form recesses, and each end of the hub being peened into said recesses; substantially as shown and described.

2. A reel-spool comprising a hub having threaded ends and a centrally-perforated flange for each end of the hub, each flange having the edge around the perforation turned outwardly in the form of a sleeve that is threaded interiorly to receive the hub, and also having a portion thereof punched away from the axis of the spool to form recesses, and each end of the hub being peened into said recesses; substantially as shown and described.

3. A reel-spool comprising a hub and a centrally-perforated flange for each end of the hub, each flange having the edge around its perforation turned outwardly in the form of a sleeve and a portion of the sleeve punched away from the axis of the spool to form recesses, and each end of the hub being peened into said recesses, and a pinion on each end of the hub, having an enlarged inner end recessed to fit over said sleeve; substantially as shown and described.

4. A click mechanism comprising, in combination, a rotatable shaft provided with a pinion; a radially-movable slide provided with a tooth adapted to engage the pinion, and having an arm extending around the pinion to a point opposite said tooth; and a coiled spring connecting said arm with a stationary support located opposite said tooth, whereby said spring is adapted to pull said tooth yieldingly into engagement with said pinion and at the same time affords equal resistance to the movement of the pinion in either direction; substantially as shown and described.

5. A reel-spool comprising a hub and a centrally-perforated flange for each end of the hub, each flange having the edge around its perforation turned outwardly in the form of a sleeve provided with an outwardly-recessed portion, and each end of the hub being seated in one of said sleeves and peened into said recesses; substantially as shown and described.

ANDREW WOLLENSAK.

Witnesses:
L. THON,
C. W. CARROLL.